Feb. 18, 1964 J. A. WILSON 3,121,534
SUPERSONIC LIQUID ATOMIZER AND ELECTRONIC OSCILLATOR THEREFOR
Filed Sept. 29, 1960
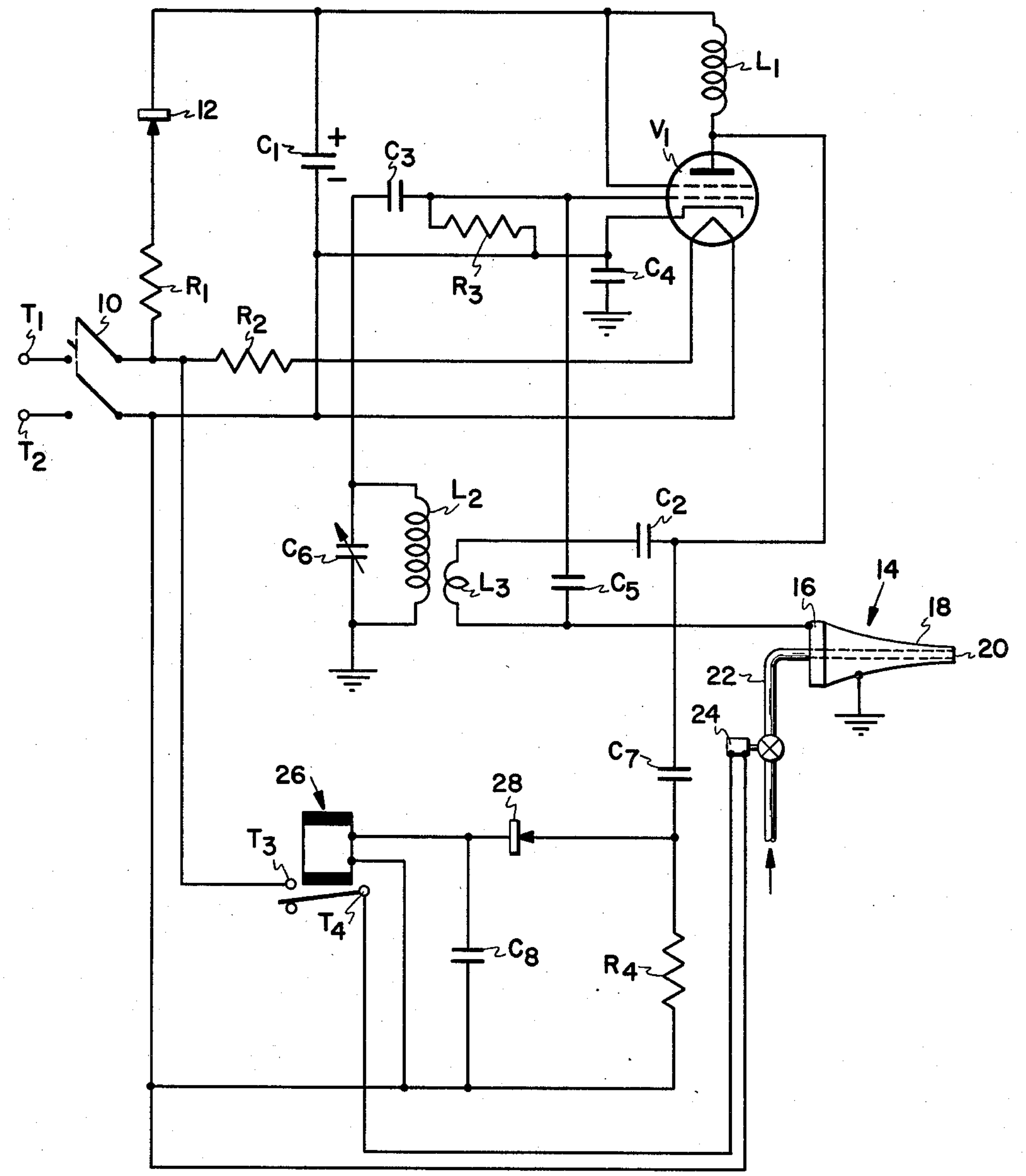
James A. Wilson Inventor
By Richard L. Cannaday
Patent Attorney United States Patent Office 3,121,534
Patented Feb. 18, 1964

3,121,534

SUPERSONIC LIQUID ATOMIZER AND ELECTRONIC OSCILLATOR THEREFOR

James A. Wilson, Stanhope, N.J., assignor to Esso Research and Engineering Company, a corporation of Delaware Filed Sept. 29, 1960, Ser. No. 59,335
6 Claims. (Cl. 239—102)

This invention relates to an electronic oscillator. It relates particularly to an electronic oscillator for use as the driving means of a transducer apparatus intended to receive inputs of alternating voltage at or above sonic frequencies and to provide outputs of relatively high mechanical displacements. It relates more particularly to an electronic oscillator for use as the driving means of such a transducer apparatus which is intended further to effect the atomization of liquids.

It is well known in the art that atomization of liquids may be effected through the use of sonic energy. A pertinent reference is the article "Ultrasonic Atomization of Liquids" by J. N. Antonevich appearing at pp. 6–15 of Transactions on Ultrasonics, February, 1959, published by the Institute of Radio Engineers. One sonic energy apparatus which has been used for atomizing liquids includes a transducer comprising a piece of ceramic piezoelectric material such as barium titanate bonded on a flat surface to the larger diametral surface of a truncated conical resonator of elastic and electrically conductive material such as aluminum.

When an alternating voltage of relatively high frequency is applied across the ceramic piece, this piece will be cyclically thickened and thinned and will generate alternate compression and rarefaction waves of sonic energy. This energy which may be characterized by a frequency above the range of normal hearing, will cause a cyclical lengthening and shortening or longitudinal vibration of the metal resonator as it flows thereinto. With decreasing cross sectional area of the conical resonator in the direction away from the ceramic piece, there will be a concentration of energy near the resonator tip and an increasing amplitude of motion. If a drop of liquid such as home heating oil be applied to the resonator tip while the resonator is being vibrated longitudinally, sonic energy will flow into this drop and the drop will be broken up into a fog of fine particles; that is, it will be atomized.

Besides a transducer, of course, a complete sonic energy apparatus for the atomization of liquids and other purposes must include a driving means, that is, a means whereby and wherefrom alternating voltage is supplied to the transducer. According to the prior art, this driving means has comprised an electronic oscillator in some cases and a rotary generator or alternator in others. It is an electronic oscillator variety of driving means, however, with which this invention is concerned.

A sonic energy transducer of the kind described is, like many other components used in alternating current circuits, characterized by a figure of merit generally designated Q. This figure represents the ratio of energy stored in the component to the energy lost therein or therefrom during equal intervals of time of an operating cycle. For a transducer comprising a disc of barium titanate bonded to the base of a conical aluminum resonator the overall or composite Q will often be as great as 2,500. This is a relatively high value, and signifies that the transducer has quite a sharp resonant peak; that is, its frequency of excitation by input voltages from the driving means must lie in a relatively very small range or narrow band for achievement of a substantially maximum amplitude of longitudinal vibration.

In the course of operation for purposes such as liquid atomization, for example, the resonant frequency of a sonic energy transducer may drift at least slightly on account of temperature changes or other causes. If the driving means imposing alternating voltage on the transducer cannot change its own output frequency to follow the drifting resonant frequency of the transducer, the latter device and the driving means will become mismatched for best operation, that is, for maximum output displacements of the transducer and maximum flow of current in the circuit of the driving means and transducer.

It is an object of this invention to provide an electronic oscillator suitable for coupling as a driving means to a temperature-sensitive sonic energy transducer having a relatively high Q, this oscillator being capable of causing best mechanical activity of the transducer over a range of resonant frequencies thereof.

It is another object of this invention to provide an electronic oscillator having the described capability and operating in class C with current feedback.

It is another object of this invention to provide an electronic oscillator having the described capability and including a tuned circuit whereby oscillations are sustained at a selected mechanical harmonic frequency of the transducer which is dictated by the tuned circuit.

It is another object of this invention to provide an electronic oscillator having the described capability and including a safety circuit to control the supply of liquid for a transducer used as an atomizer in such a way that there will be a flow of liquid only when driving power is furnished to the transducer.

These and various other objects and advantages of this invention, as well as its nature and substance, will be more clearly perceived and fully understood by referring to the following description and claims taken in connection with the accompanying drawing which represents a circuit diagram of the electronic oscillator of this invention connected to a sonic energy transducer.

Referring now to the drawing in detail, $T_1$ and $T_2$ are input terminals across which an alternating voltage is supplied to the oscillator circuit from a source not shown. For an actual reduction to practice of this invention of which the circuit component values are given herein, a supply voltage of 115 v. A.C. at 60 cycles/sec. has been used. Application of this voltage to the circuit is permitted or prohibited by double pole, single throw switch 10 shown in its open position.

$R_1$ is a 20-ohm resistor which limits the flow of current through rectifier 12 due to the charging of capacitor $C_1$. $R_2$ is a 450-ohm, 10-watt resistor which limits the flow of current through the filament heater of vacuum tube $V_1$, maintaining this current at a correct operating value of about 150 milliamperes. $C_1$ is a 40-microfarad, 150-volt electrolytic capacitor which provides storage capacity for pulsating direct current power from rectifier 12. This rectifier is a type M–150 silicon diode. It passes only the positive half cycles of alternating voltage from the power source to give a pulsating direct voltage output. $L_1$ is a 40-millihenry, 20-ohm D.C. inductor which affords a low resistance direct current path between the power supply and the plate of vacuum tube $V_1$. Conversely, it provides a high resistance path for high frequency alternating current, that is, for currents having a frequency on the order of 50 kilocycles/sec. and higher.

Vacuum tube $V_1$ is a type 50L6 beam power tetrode having a 50-volt filament. $C_2$ is a 0.1 microfarad capacitor which prohibits direct voltage on the plate of vacuum tube $V_1$ from reaching the terminals of sonic energy transducer 14. On the other hand, this capacitor acts as a coupler affording a low resistance path for the flow of high frequency alternating current to the transducer terminals from the plate side of the tube. $C_3$ is a 0.005 microfarad capacitor which acts as a block to prevent direct current short circuiting to ground of the control grid of vacuum tube $V_1$ through grid tuning coil $L_2$, but affords a low resistance path for the flow of high frequency alternating current from coil $L_2$ to the control grid.

$R_3$ is a 47-kilohm resistor which provides a path for the flow of direct current induced in the control grid circuit by the presence of high frequency alternating current at the grid terminal. This resistor develops a control grid bias for vacuum tube $V_1$. $C_4$ is a 0.1 microfarad capacitor which isolates the power supply from the frame ground of the equipment, but acts as a coupler to provide a low resistance path for the flow of high frequency alternating current to the terminals of sonic energy transducer 14. $R_3$ provides a D.C. path for current flow between the grid and cathode of $V_1$ and is shown connected between these two elements. The current in one direction (D.C.) is the result of the diode action of the grid-cathode relationship and the resultant rectification of the high frequency A.C. voltage applied to said circuit. $C_5$ is a 33-micromicrofarad capacitor which permits negative feedback from the output circuit of transducer 14 to the control grid of the vacuum tube. Negative feedback from output to input of a circuit generally has the effect of reducing output. It is employed in the oscillator circuit of this invention to effect an improvement in power factor, specifically, to improve the phase relation of voltage and current to transducer 14.

The transducer operates at a frequency just above true series residence (or the maximum current condition). This produces a slight lag in the inductive current feedback loop coupled to the grid circuit of $V_1$. Capacitor $C_5$ provides a small amount of capacitive feedback which is very close to 180° phase angle (or negative) to correct for the slight inductive effect of the transducer.

$L_2$ is a 10-millihenry grid tuning coil having a Q of at least 100. $C_6$ is a grid tuning capacitor having a range up to 1000 micromicrofarads. The combination of inductance and capacitance provided by $L_2$ and $C_6$ is tuned to the mechanical harmonic frequency at which transducer 14 is to operate, a frequency of 70,000 kilocycles/sec. for example. $L_3$ is a 0.6 microhenry current feedback coil having many times fewer turns than grid tuning coil $L_2$. Coils $L_2$ and $L_3$ are, however, electro-magnetically coupled closely together. The output current from vacuum tube $V_1$ to transducer 14 flows through coil $L_3$, inducing a voltage in coil $L_2$ which appears at the control grid of the tube. The voltage so appearing represents positive feedback, and causes the circuit to sustain itself in an oscillating condition. This feedback and oscillation-sustaining effect occurs most efficently when grid tuning coil $L_2$ and capacitor $C_6$ together are tuned to an active mechanical harmonic frequency of transducer 14.

Transducer 14 as shown comprises a relatively thin disc of piezo-electric material 16 bonded to the larger end of a metallic and electrically conductive resonator 18 of truncated conical form. This transducer, the illustrated design of which is representative only, is characterized by an axial hole 20 through both elements 16 and 18. Fastened to piezo-electric element 16 in alignment with this hole is a liquid feed conduit 22 which includes a solenoid-operated stop valve 24. In the absence of energizing current to its coil element, valve 24 is normally closed.

$C_7$ is a 100-micromicrofarad capacitor, and $R_4$ is a 10-kilohm resistor. High frequency alternating voltage from vacuum tube $V_1$ appears across capacitor $C_7$ and resistor $R_4$ in series. Capacitor $C_7$ serves to block the flow of direct current from the plate of vacuum tube $V_1$ and any low frequency alternating current which may come from a poorly filtered power supply. A reasonable amount of high frequency alternating current will be passed by capacitor $C_7$ acting as a coupler between the oscillator circuit itself and the safety circuit including relay 26 which serves to prevent flow of liquid for atomization to transducer 14 except when the transducer has driving power furnished to it.

Resistor $R_4$ acts as a proportioning device in respect of alternating current passed by capacitor $C_7$ to allow enough current to be supplied to rectifier 28 to satisfy the operating requirement of relay 26, about 2 milliamperes direct current, which is normally open across its external terminals $T_3$ and $T_4$. Rectifier 28 is a type IN34 germanium device which receives alternating current from vacuum tube $V_1$, and passes a pulsating direct current. $C_8$ is a 0.1 microfarad capacitor which acts as a storage device for this pulsating current which flows through the coil element of relay 26 and also through resistor $R_4$. When there is an adequate amount of high frequency alternating current available from the oscillator circuit at capacitor $C_7$, relay 26 will be energized to close across terminals $T_3$ and $T_4$. Upon the effecting of closure across these terminals a power circuit will be completed through the coil element of solenoid-operated valve 24 to open this valve, and allow liquid for atomization to flow through conduit 22 into transducer 14.

The oscillator as described affords a means of obtaining relatively large plate currents at low plate voltages in vacuum tube $V_1$. This provides efficient coupling for transducers such as sonic energy transducer 14 having load resistances in the range of about 100 to 1000 ohms. The basic control of oscillation is exerted through the transducer, and changes in the resonant frequency of the transducer due to changes in temperature, for example, result, in corresponding changes in the operating frequency of the oscillator.

The resonant frequency of operation of sonic energy transducer 14 is a series resonant frequency. Accordingly, maximum transducer activity or performance is obtained at a condition of maximum current. Transducer current flows through feedback coil $L_3$ coupled to tuning coil $L_2$ of the grid circuit to provide positive feedback, and therefore the higher the transducer or output current, the more negative the control grid voltage of tube $V_1$. Grid bias on the vacuum tube of the oscillator of this invention is sustained at an average level about double the amount required to cause plate current to cease to flow. In this circumstance, class $C_2$ operation by definition, plate current flows only on the positive peaks of the grid excitation voltage.

A transducer intended to be driven by the oscillator of this invention may have more than one resonant frequency; that is, longitudinal vibrations may be sustained in it at more than one mechanical harmonic or mode designated as half wavelength, full wavelength, three halves wavelength, etc. It is desirable to select the one of these harmonics for the oscillator/driver operating point which will be the most efficient with respect to energy conversion in the transducer. The tuned circuit including coil $L_2$ and capacitor $C_6$ which is coupled to the output circuit through coil $L_3$ and connected to the control grid of tube $V_1$ is adjusted to provide a relatively broad resonance at the selected mechanical harmonic of the transducer. Such adjustment results in maximum current feedback at this one harmonic, and oscillator operation is sustained at this point.

Although this invention has been described with a certain degree of particularity, it is to be understood that the present disclosure has been made only by way of example, especially with regard to numerical quantities given herein, and that some changes in the details of construction may be resorted to without departing from the spirit and scope of this invention as hereinafter claimed.

What is claimed is:

1. In the operation of an electro-mechanical transducer having a sharply defined and changeable resonant frequency by means of an electronic oscillator comprising (1) a vacuum tube including a grid element, and (2) a grid tuning circuit coupled to said transducer, a process for holding the frequency of said oscillator matched with the resonant frequency of said transducer which comprises the step of feeding back current flowing through said transducer to said grid tuning circuit to induce a positive feedback voltage at the grid element of said vacuum tube.

2. A process according to claim 1 in which a sufficiently large current is fed back to induce a sufficiently negative grid voltage to cause class C operation of said vacuum tube.

3. A process according to claim 1 which further comprises the step of producing negative feedback in the grid element of said vacuum tube a part of the transducer voltage, and thereby improving the phase relationship between the transducer current and voltage to achieve a better overall power factor.

4. An electronic oscillator having a current feedback system which comprises (1) a vacuum tube including a plate element and a grid element, (2) a tuning circuit capacitively connected on one side of the grid element of said vacuum tube and connected on the other side to ground, said circuit including a variable capacitor and a first inductor, and (3) a second inductor coupled closely to said first inductor, said second inductor being capacitively connected on one side to the plate element of said vacuum tube and capacitively connected on the other side to the grid element, and said second inductor additionally being connected on said other side to a load driven by said oscillator.

5. An electronic oscillator according to claim 4 in which said vacuum tube is a beam power tetrode vacuum tube and said grid element is a control grid element.

6. An electronic oscillator according to claim 4 having additionally (1) a transducer connected to said second inductor as a load, said transducer being adapted to receive inputs of alternating voltage at sonic frequencies and higher and to provide outputs of relatively high mechanical displacements, and being adapted further to receive liquid material for atomization, (2) a conduit connected to said transducer wherethrough liquid material to be atomized by said transducer may be fed thereto, (3) a stop valve in said conduit, said valve being normally closed but having electrically actuated opening means, (4) first transmission means extending from said electrically actuated opening means whereby said opening means may be connected with an external power source, (5) an electrically-actuated relay connected in said first transmission means across its external terminals, said relay being normally open across these terminals to interrupt said first transmission means, and (6) second transmission means extending from the coil element of said relay whereby said coil element may be connected with an external power source, said second transmission means defining a connection between said coil element and the plate element of said vacuum tube.

References Cited in the file of this patent

UNITED STATES PATENTS

| | | |
|---|---|---|
| 2,234,184 | MacLaren | Mar. 11, 1941 |
| 2,453,595 | Rosenthal | Nov. 9, 1948 |
| 2,543,030 | King | Feb. 27, 1951 |
| 2,638,567 | Cronin | May 12, 1953 |
| 2,774,874 | Heinecke | Dec. 18, 1956 |
| 2,917,691 | Prisco | Dec. 15, 1959 |
| 2,949,900 | Bodine | Aug. 23, 1960 |

OTHER REFERENCES

Seely: "Electron-Tube Circuits," McGraw Hill, New York, 1950. (Sec. 5-6 and 5-8.)

Dow, W. G.: Fundamentals of Engineering Electronics, second edition, John Wiley and Sons, New York, 1952, page 327.

Grob and Kiver: Applications of Electronics, McGraw-Hill, New York, 1960, pages 22–25.